Jan. 18, 1966  L. F. STUCKEY  3,229,551
SHIFTING MECHANISM

Filed June 10, 1963  2 Sheets-Sheet 1

Jan. 18, 1966   L. F. STUCKEY   3,229,551
SHIFTING MECHANISM
Filed June 10, 1963   2 Sheets-Sheet 2

United States Patent Office 3,229,551
Patented Jan. 18, 1966

3,229,551
SHIFTING MECHANISM
Louis F. Stuckey, Toledo, Ohio, assignor to Dana Corporation, Toledo, Ohio, a corporation of Virginia
Filed June 10, 1963, Ser. No. 286,547
10 Claims. (Cl. 74—745)

This invention relates to automotive transmissions of the type including a main multi-speed transmission and an auxiliary multi-speed transmission connected in serial relationship, and more particularly to a shifting mechanism for such an automotive transmission.

Such automotive transmissions including serially connected main and auxiliary transmissions are relatively old in the art, and are used in instances where a wide range of gear ratios are desired in transmitting torque from the prime mover to the device to be driven. The combination normally is manufactured in one of two manners, that is, the main transmission includes a plurality of wide-step shift ranges or power paths and the auxiliary is of the splitter type so that the ratios or power paths available therein are effective to split the steps in the main transmission; or alternatively, the main transmission may have a plurality of normally spaced close steps and the auxiliary is of the high and low range type so that it compounds the ratios available in the main transmission.

With either of the above arrangements, it is desirable that only one shift be made at a time, that is, that the main transmission and the auxiliary transmission be shiftable one at a time. Further, since the shift pattern of the main transmission is usually provided with a neutral position, while the range or splitter auxiliary is not, it is desirable to shift the auxiliary only when the main transmission is in a neutral position, since the range shift would result in a large overall ratio change if shifted while the main transmission remained in a given ratio; such large ratio changes being undesirable in normal operation.

Various prior art control or actuation devices disclose mechanisms to insure that the auxiliary only shifts when the main transmission is in neutral. However, such devices are expensive, complex, have a multitude of parts, and are not conveniently located, durable or easy to maintain.

It is, therefore, an object of this invention to provide an automotive transmission including at least a pair of input power path means and at least a pair of output power path means operatively disposed between the input means and the final output means wherein the control means and the final output means wherein the control system for shifting the various power paths allows shifting the output power path means only when the input power path means are in a neutral position.

Another object of this invention is to provide a control system for an automotive transmission having a main transmission and an auxiliary transmission serially connected thereto, which control system allows actuating the shifting of the auxiliary only when the controls of the main transmission are in a neutral position, and shifting of the controls of the main transmission only when the auxiliary transmission control is in one of its operative positions.

It is another object of this invention to provide a main transmission having means for shifting the gears therein and a servo motor means for shifting an auxiliary transmission connected serially thereto, wherein the shifting means for the main transmission and the actuating means for the servo motor means are interlocked so that the actuating means is operative to energize the servo motor to shift the auxiliary transmission only when the shifting means of the main transmission is in a neutral condition, and the shifting means for the main transmission is only operative to shift from a neutral condition when the actuating means is in one of its operative positions.

Further and other objects of this invention will become apparent upon a consideration of the specification in view of the following drawings wherein.

Figure 1:
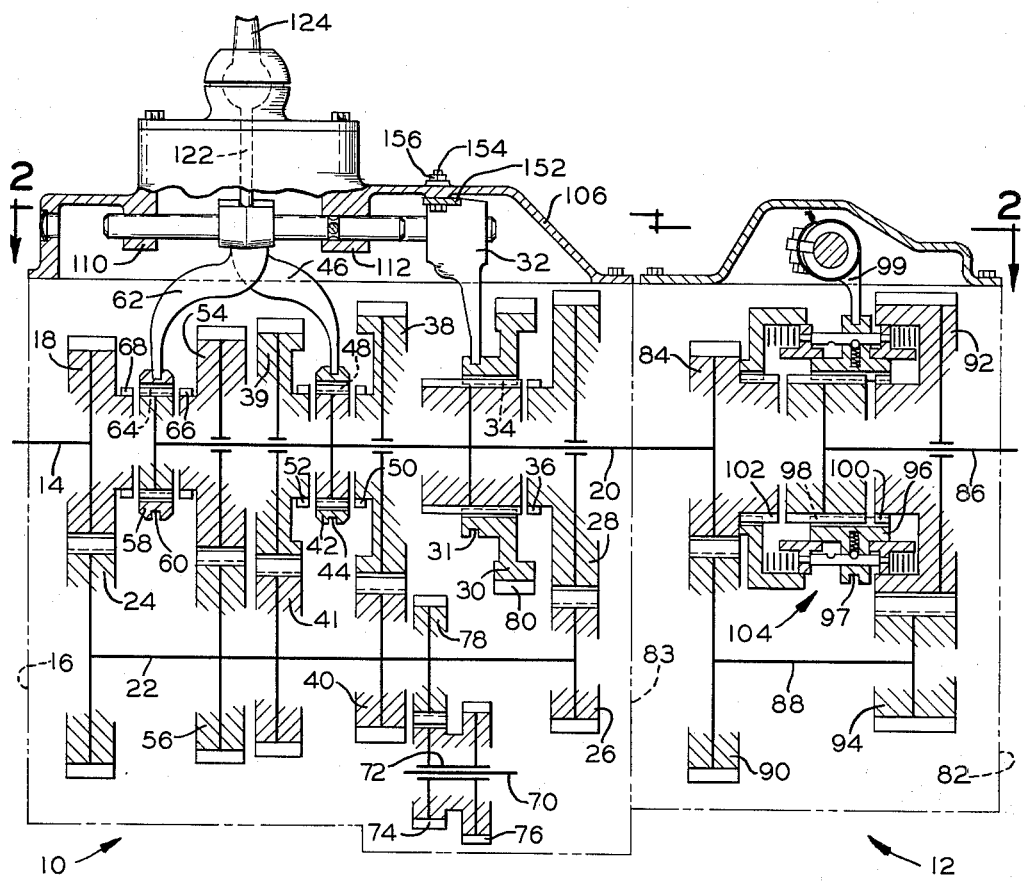
FIG. 1 is a side elevational view, partly in section and partly diagrammatic, of an automotive transmission including a main transmission and an auxiliary transmission embodying this invention, the portion in section being taken along the lines 1—1 in FIG. 2.

In one preferred embodiment of this invention, a five-speed main transmission having five power paths therein is provided with a plurality of shift rods and a shift lever for shifting the gears therein, which gears have neutral positions. An auxiliary transmission, having a pair of power paths including a shiftable gear and servo motor means for shifting of the gear, is adapted to serially receive the torque from the main transmission and in turn to transmit torque to the driven member. The auxiliary transmission has at least a selectable first and second power path through the same, with no provision for a neutral condition, which is not needed in view of the provision for neutral in the main transmission; however, it is understood that a neutral position, when desired, can easily be provided in the auxiliary.

An actuating means in the form of a valve, which is adapted to selectively direct fluid power to the servo motor means, is carried by the main transmission. The valve includes a slidable stem disposed in cooperative relationship with the shift rods of the main transmission. Interlock means connect the shift rods and the valve stem whereby the stem may only be moved when the shift rods are in their neutral position, and the shift rods may only be moved when the stem is in one of its alternate operative positions. This entirely eliminates the possibility of a shift in the main transmission and a shift in the auxiliary transmission occurring simultaneously.

Referring to the drawings, the automotive transmission includes a main transmission 10 and an auxiliary transmission 12 disposed in aligned relationship. An input shaft 14 adapted to be driven by a source of power is suitably rotatably mounted in the case 16 of the transmission 10 and has a drive gear 18 mounted thereon for unitary rotation. An intermediate output shaft 20 is coaxially aligned with the shaft 14 and mounted in the case 16 for rotation relative to the input shaft 14.

A countershaft 22 is disposed in spaced parallel relationship with respect to the shafts 14 and 20 and suitably mounted for rotation in the case 16. A countershaft drive gear 24 is mounted on the shaft 22 for unitary rotation and is in a constant driven relationship with the drive gear 18 so that the countershaft rotates simultaneously with the input shaft 14.

A plurality of paired gears of different ratios to provide different power paths are provided on the countershaft 22 and output shaft 20 and adapted to be selectively energized whereby torque is transmitted between the shafts; additionally, means are provided to connect the input shaft to the output shaft for direct drive. More particularly, a low or first speed countershaft gear 26 is secured for unitary rotation to the right end of the countershaft 22 and is constantly meshingly engaged with an output shaft first speed gear 28, which gear is rotatably mounted on the output shaft 20. A first and reverse clutch means in the form of a clutch collar 30 is splined on the shaft 20 for unitary rotation therewith and axial movement relative thereto, and is adapted to be moved axially by a shift fork 32 which engages a slot 31 therein. Upon movement to the right of the collar 30 the internal splines 34 thereof clutchingly engage external clutch teeth 36 carried by the gear 28 so that the gear 28 is drivingly connected to the shaft 20, and the shaft 20 which forms the output of all the main transmission power paths is drivingly connected to the input shaft 14 in low ratio power path through the gears 26 and 28 the countershaft 22 and the gears 24 and 18.

A second speed output shaft gear 38 and a third speed output shaft gear 39 are rotatably mounted on the shaft 20 and are respectively constantly meshingly engaged with countershaft second speed gear 40 and third speed gear 41 which are mounted for unitary rotation on the countershaft 22. Splined on the shaft 20 intermediate the gears 38 and 39 and adapted for unitary rotation with and axial movement relative to the shaft 20 is a second and third speed clutch means in the form of a clutch collar 42. The collar 42 is provided with a peripheral slot 44 which is engaged by a shift fork 46 adapted to shift the collar 42 in opposite axial directions. Upon being shifted to the right from its neutral or intermediate position, internal splines 48 in the collar 42 clutchingly engage external clutch teeth 50 carried by the gear 38 thereby drivingly connecting the gear 38 to the output shaft 20 so that the shaft 20 is drivingly connected to the input shaft 14 in the second speed ratio or power path provided by the gears 38 and 40, the countershaft 22 and the gears 24 and 18. Upon the collar 42 being shifted to the left from its intermediate position, the teeth 48 thereon clutchingly engage external clutch teeth 52 carried by the gear 39 thereby drivingly connecting the gear 39 to the output shaft 20 so that the shaft 20 is drivingly connected to the input shaft 14 and driven in the third speed ratio or power path provided by the gears 39 and 41 the countershaft 22 and the gears 24 and 18.

A fourth speed output shaft gear 54 is rotatably mounted on the shaft 20 and constantly meshingly engages a fourth speed countershaft gear 56 mounted for unitary rotation on the countershaft 22. A fourth speed and direct drive clutch means in the form of a clutch collar 58 is splined on the shaft 20 to the left of the gear 54 and is adapted for unitary rotation with an axial movement relative to the shaft 20. The collar 58 is provided with a peripheral slot 60 which is engaged by a shift fork 62 adapted to shift the collar 58 in opposite axial directions. Upon being shifted to the right from its neutral or intermediate position, internal splines 64 in the collar 58 clutchingly engage external clutch teeth 66 carried by the gear 54 thereby drivingly connecting the gear 54 to the output shaft 20 so that the shaft 20 is driven by the input shaft 14 through the fourth speed ratio or power path gears 54 and 56, the countershaft 22 and the gears 18 and 24. Upon the collar 58 being shifted to the left, the teeth 64 thereon engage external clutch teeth 68 carried by the drive gear 18, thereby directly drivingly connecting the output shaft 20 to the input shaft 14 for fifth speed power path or direct drive. In the main transmission as shown in FIG. 1, the gears have been selected so as to result in a series of close step gear ratios.

Reversing means are also provided to reverse the rotation of the output shaft 20 in relationship to the input shaft 14. A reverse idler shaft 70 (shown out of its normal position behind the shaft 22 for clarity purposes) is securedly carried by the case 16 and rotatably mounts a cluster gear 72 having toothed portions 74 and 76. The toothed portion 74 is constantly drivingly meshed with a countershaft reverse gear 78, mounted for unitary rotation on the shaft 22, so that the cluster gear 72 is constantly driven by the input shaft 14. The other toothed portion 76 is adapted to be clutchingly engaged by peripheral gear teeth 80 on the first and reverse clutch gear 30 when the latter is moved to the left from its neutral or intermediate position so that the output shaft 20 is drivingly connected for reverse rotation to the input shaft 14 through the cluster gear 72 and countershaft 22.

A case 82 of the auxiliary transmission 12 may be formed unitarily with, integrally with, abutting against, or spaced from the main transmission 10; however, as shown in FIG. 1, it is formed integrally with the case 10 and has a common end wall 83. The intermediate output shaft 20 of the main transmission 10 extends through the wall 83, being suitably mounted for rotation therein, and carries for unitary rotation an auxiliary drive gear 84. It is understood that if the auxiliary transmission 12 is spaced from the transmission 10 a suitable driveline would be required between the transmissions. Aligned with and rotatable relative to the shaft 20 is a final output shaft 86 rotatably mounted in the case 12. An auxiliary countershaft 88 is rotatably mounted in the case 12 in a spaced and relatively rotatable relationship with the shafts 20 and 86 and mounts for unitary rotation an auxiliary countershaft drive gear 90 which is constantly drivingly meshed with the drive gear 84 so that the countershaft 88 is adapted for simultaneous rotation with the shaft 20.

Means provide a pair of power paths between the output shaft 20 and the final output shaft 86. More particularly, the output shaft 86 has rotatably mounted thereon a gear 92 which is constantly drivingly meshed with a countershaft gear 94 carried for unitary rotation by the shaft 88. Splined to the shaft 86 between the gear 84 and the gear 92, and axially movable relative thereto is a clutch means in the form of a clutch collar 96. The collar 96 is provided with a peripheral slot 97 which is engaged by a shift fork 99; the latter being adapted to move the collar 96 in opposite axial directions.

Upon being moved to the right, internal splines 98 in the collar 96 clutchingly engage external clutch teeth 100 carried by the gear 92 so that the gear 92 is drivingly connected to the final output shaft 86 and the latter is drivingly connected to the shaft 20 in an underdrive ratio or power path through the gears 92 and 94, the countershaft 88 and the gears 84 and 90. Upon being shifted to the left, the splines 98 of the collar 96 clutchingly engage external clutch teeth 102 carried by the auxiliary drive gear 84, so that the final output shaft 86 is directly engaged with the main transmission output shaft 20 in a direct drive power path.

Suitable synchronizing means shown generally at 104 is carried by the clutch collar 96 and by the gears 84 and 92 so that the shifting of the clutch collar 96 into alternate engagement with the gears 84 or 92 is synchronized by the synchronizing means 104. As shown, there is no provision for neutral in the auxiliary transmission 12, the collar 96 engaging either the gears 84 or 92; however, if desired a neutral position can be provided in a manner well known in the art.

As shown in FIG. 1, the direct engagement of the shafts 86 and 20 results in direct or high range drive conditions, while the clutching of gear 92 to the shaft 86 results in underdrive or low range operating conditions. The ratios in this auxiliary transmission 12 can also be selected so that direct drive or a splitting ratio or an overdrive is obtained; additionally, more gear ratios can be provided to further compound or split the ratios of the main transmission 10.

Figure 2:
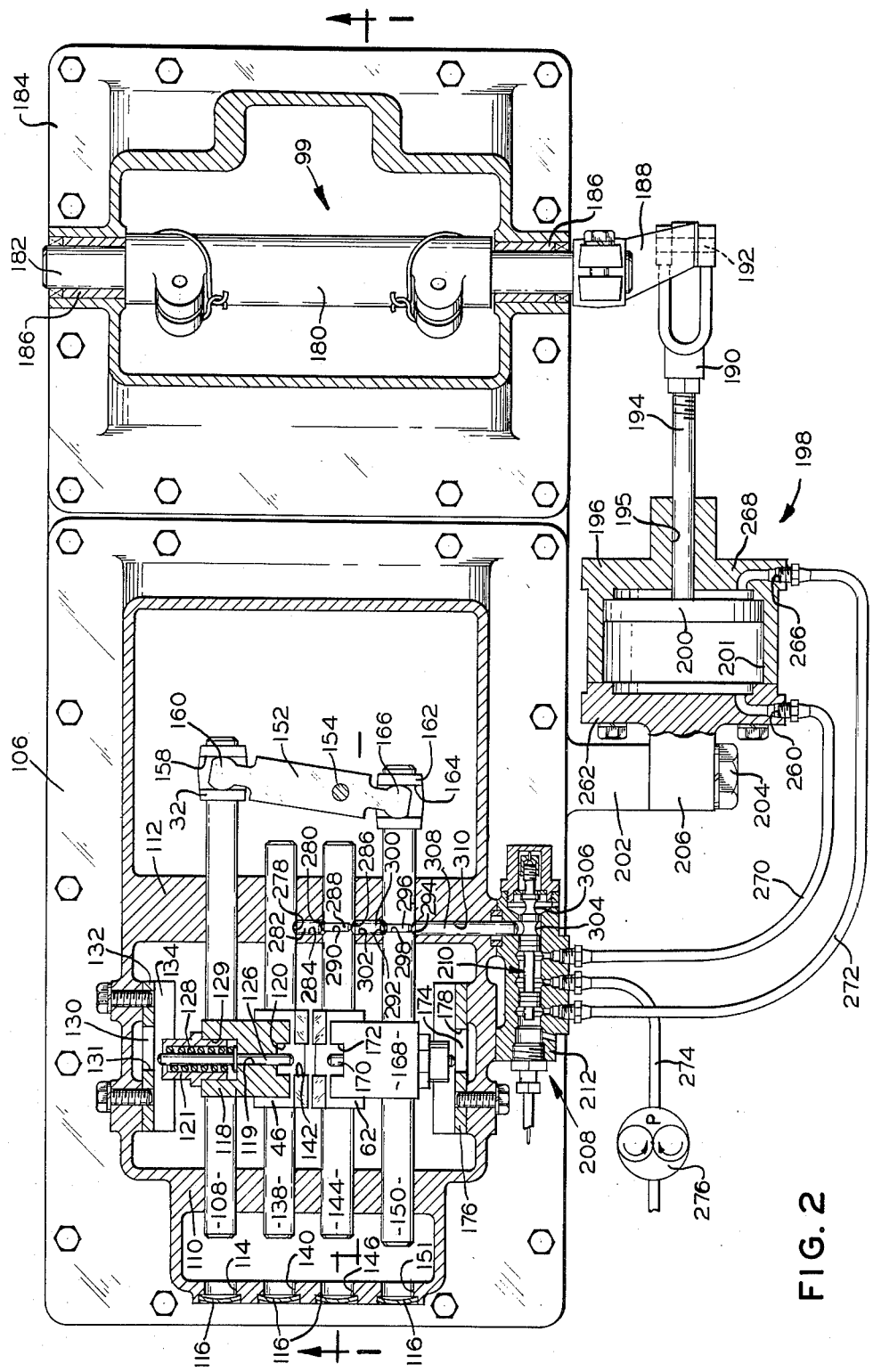
FIG. 2 is a sectional view of the transmission showing the covers and control assemblies thereof taken along the line 2—2 in FIG. 1.

A plurality of means are provided to actuate the clutch collars 30, 42, 58 and 96. More particularly, a cover 106 is suitably secured to the case 16 of the main transmission 10 and has slidably mounted therein a plurality of laterally spaced, parallel, uniplanar shift rods. As seen in FIG. 2, the uppermost or first and reverse rod 108 is slidably mounted in a pair of spaced bosses 110 and 112 formed in the cover 106, having been inserted in the cover 106 through an opening 114 in the end thereof, which opening is covered by a plug 116. The rod 108 securedly carries at its right end the shift fork 32, which fork engages the first and reverse clutch collar 30. Suitably secured to the rod 108, on the portion thereof intermediate the bosses 110 and 112, is a selector block 118, having a slot 120 formed on the inner and upper surface thereof. The slot 120 is adapted to be engaged by a shift finger 122 depending from and actuated by a shift lever 124. When the lever 124 is pivoted to the left, as seen from the output or rear end of the transmission 10, the finger 122 moves to the right into engagement with the slot 120.

A poppet 126 is slidably mounted in a bore 119 in the selector block 118 and a cap 121 secured to the block and is normally biased inwardly, so that the inner end thereof projects into the slot 120, by a compression spring 128 mounted in a counterbore 129 in the block 118 and secured to the block by the cap 121, and the outer end of the poppet slightly projects from the block. When the shift finger 122 engages the slot 120, it forces the poppet 126 outwardly against the bias of the spring 128 and into an elongated slot 130 formed in an U-shaped plate 132 carried by the cover 106. A base 134 of the plate 132 engages the cap 121 on the selector block 118 to prevent rotary movement or cocking thereof. When the position of the block 118 is as shown in FIG. 2, the rod 108 is in its neutral position, and the poppet 126, if extended by the finger 122, will project into the slot 130. The slot 130 is positioned so that the block 118 may only be moved rearwardly when the poppet 126 projects therefrom, for if moved forwardly, the poppet 126, would engage a front end 131 of the slot 130. This rearward movement of the block 118, energized by the finger 122 when the lever 124 is rocked to the left and then forwardly, moves the rod 108 and shift fork 132 rearwardly thereby shifting the collar 30 rearwardly and engaging the clutch teeth 34 thereon with the teeth 36 of the first speed gear 28 thereby adapting the transmission 10 for first speed operation. Since the extended poppet is adjusted to engage the front end 131 of the slot 130 the rod 108 cannot be moved forwardly from its neutral position by the finger 122 engaging the slot 120.

A second and third speed shift rod 138 is slidably mounted in the bosses 110 and 112 just below the rod 108, as viewed in FIG. 2, having been inserted in the cover 106 through an opening 140 therein covered by a plug 116, and has suitably mounted thereon for unitary movement the upper portion of the shift fork 46. The fork 46 is provided with a slot 142 formed in the upper surface thereof, which slot is adapted to be engaged by the shift finger 122 when the lever 124 is rocked slightly to the right from its first and reverse position, and moved forwardly and rearwardly thereby. Rearward movement of the fork 46 moves the clutch collar 42 rearwardly so that the teeth 48 therein engage the teeth 50 on the gear 38 so that the transmission 10 is adapted for second speed operation, while forward movement of the fork 46 moves the clutch collar 42 forwardly so that the teeth 48 therein engage the teeth 52 on the gear 39 so that the transmission 10 is adapted for third speed operation.

A fourth and fifth speed shift rod 144 is slidably mounted in the bosses 110 and 112, having been inserted on the cover 106 through an opening 146 therein covered by a plug 116, and suitably mounts thereon for unitary movement the upper portion of the shift fork 62. The fork 62 is provided with a slot 148 formed in the upper surface thereof, which slot is adapted to be engaged by the shift finger 122, when the lever 124 is rocked slightly further to the right from the second and third speed position, and moved forwardly and rearwardly thereby. Rearward movement of the fork 62 moves the clutch collar 58 rearwardly so that the teeth 64 therein engage the teeth 66 on the gear 54 so that the transmission 10 is adapted for fourth speed operation, while forward movement of the fork 62 moves the clutch collar 58 forwardly so that the teeth 64 therein engage the teeth 68 on the gear 18 so that the transmission 10 is adapted for fifth speed or direct drive operation.

Means are also provided for shifting the transmission 10 for reverse operation. The reverse rod 108, which carried the first and reverse shift fork 32, must be moved forwardly to shift the collar 30 forwardly to engage the gear teeth 76 for reverse. As pointed out above, if the shift finger 122 engages the slot 120 in the shifter block 118, the poppet 126 is extended so that the rod 108 can only be shifted rearwardly, but not forwardly. To shift the rod forwardly, the same is connected to a reverse actuating rod 150 by a cross-over lever 152. The rod 150 is slidably mounted in the bosses 110 and 112 having been inserted in the cover 106 through an opening 151 covered by a plug 116, and is disposed just below the rod 144 as viewed in FIG. 2.

The cross-over lever 152 is suitably pivotally mounted to the cover 106 as by means of a bolt 154 passing through the lever and cover and threadedly receiving a nut 156. The shift fork 32 is provided with a slot 158 formed in the top thereof, which slot pivotally receives one arcuately formed end 160 of the lever 152. The rod 150 has suitably secured to the right end thereof a sleeve 162, which sleeve has a slot 164 formed in the top thereof which pivotally receives the other arcuately formed end 166 of the lever 152. In this manner rearward and forward movement of the rod 150 are translated to forward and rearward movement respectively of the rod 108. The shift to reverse requires a greater forward movement of the first and reverse gear 30 than the shift to first speed requires the gear 30 to move rearwardly. To balance the shifting pattern so that the shift lever 124 is rocked the same distance forward and rearwardly for first and reverse, the bolt 154 pivotal engagement with the cross-over lever 152 is closer to the end 166 than it is to the end 160 so that for a given movement of the rod 150, the rod 108 will be moved a greater distance.

A selector block 168 is suitable secured to the rod 150 intermediate the bosses 110 and 112 and is of the same construction as the block 118 but a mirror image thereof, and has a spring loaded poppet 170 extending into a slot 172 formed on the inner face thereof. When the finger 122 is moved into engagement with the slot 172, the same urges the poppet 170 to extend from the block 168 into a slot 174 disposed in a U-shaped plate 176 suitably secured to the cover 106. The block 168 can only be moved rearwardly, since if the same is moved forwardly, the poppet 170 will engage a front end 178 of the slot 174, while the slot extends sufficiently rearwardly to allow the block and poppet to be urged rearwardly by the finger 122. In moving the block 168 and rod 150 rearwardly, the first and reverse shift fork 32 and rod 108 are moved forwardly thereby moving the collar 30 forwardly so that the teeth 80 of the collar 30 engage the teeth 76 of the gear 72 and adapt the transmission 10 for reverse operation. It should be noted that in this shifting sequence, the poppet 126 is not extended from the block 118 so that it does not interfere with the forward movement of the rod 108. Likewise, with the finger 122 in the notch 120 of the block 118, the poppet 170 in block 168 is not extended and does not interfere with the forward movement of the rod 150.

Means are provided to cause movement of the auxiliary shift fork 99 thereby moving the clutch collar 96 forwardly and rearwardly. More particularly, the fork 99 includes a laterally extending boss 180 which is securedly mounted on a cross shaft 182, the latter being mounted for rocking movement in a cover 184 of the auxiliary transmission 12 by bearings 186. The lower end of the cross shaft 182 (as viewed in FIG. 2) extends from the cover 184 and has suitably secured thereto a depending crank arm 188. A bifurcated connecting rod 190 receives the lower end of the crank arm 188 between its bifurcations and a pin 192 pivotally connects the same. The connecting rod 190 is suitably secured to a piston rod 194 which extends through an opening 195 in a cylinder 196 of a double acting servo motor 198. A piston 200 is slidably mounted in a bore 201 of the cylinder 196 and suitably secured to the piston rod 194 thereby being adapted to move the latter forwardly and rearwardly which in turn rocks the lower end of the crank arm 188 forwardly and rearwardly and moving the lower end of the shift fork 99 forwardly and rearwardly. A boss 202 extends from the cover 106 and secured thereto, as by a bolt 204, is a boss 206 formed on the cylinder 196 thereby securedly mounting the servo motor 198 to the cover 106 in a stationary position relative to the crank arm 188.

An actuating valve 208 is provided to energize the servo motor 198, which valve is carried by the cover 106 and positioned so that an actuating valve stem 210 slidably mounted in the valve body 212 is disposed in parallel uniplanar relationship with the rods 108, 138, 144 and 150.

Figure 3:
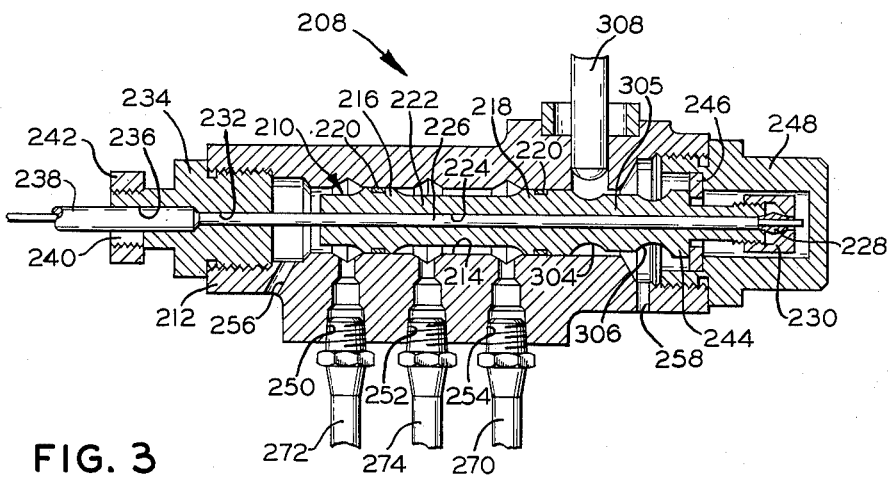
FIG. 3 is a longitudinal sectional view of the control valve shown in FIG. 2.

The valve body 212 is provided with a central bore 214 wherein the stem 210 is disposed. As seen in FIG. 3 and commencing from the left, the stem 210 has a pair of spaced lands 216 and 218, each provided with a suitable peripheral sealing means 220, which slidably engage the bore 214, while the portion of the stem between the lands is reduced in diameter as shown at 222. A central opening 224 extends axially through the stem 210 and receives a control wire 226 which terminates beyond the right end of the stem. A ring 228 is securely pressed on the wire 226 and surrounded by a stem cap 230 threaded on the end of the stem 210, which cap secures the ring 228 to the stem whereby the latter and the wire move unitarily. The left end of the control wire extends from the stem 210 through an opening 232 in an end plug 234 threaded into the left end of the bore 214. The opening 232 is counterbored as shown at 236, which counterbore receives a control wire cover 238. The end plug 234, at the counterbore location, is provided with a plurality of axially extending slots, one of which is shown at 240, while the periphery of the plug is threaded and receives a compression lock nut 242, which nut when threaded onto the cap compresses the same into secure engagement with the wire cover 238.

The control wire 226 is adapted to be moved by the operator axially with respect to the valve body 212 thereby moving the stem 210 to the right and left. Movement to the right of the stem 210 is limited by the engagement of a shoulder 244 on the stem adjacent the right end thereof with a stop ring 246 carried in an end plug 248 threaded into the right end of the bore 214.

A plurality of fluid carrying openings are confluent with the bore 214. Starting from the left of the valve 208, a first tapped opening 250 is formed in the valve body 212, which opening, when the stem is positioned to the right as shown in FIG. 3, is confluent with the bore 214 to the left of the land 216 on the stem 210; a second tapped opening 252 is confluent with the bore 214 immediately to the right of the land 216; while a third tapped opening 254 is confluent with the bore 214 to the right of the opening 252 and to the left of the land 218. Accordingly, with the stem as shown in FIG. 3, the openings 252 and 254 are in a confluent relationship as a result of the reduced portion 222 of the stem 210 while being blocked from the opening 250 by the land 216. In this position, the opening 250 is confluent with a vent opening 256 formed in the valve body 212 at a position immediately to the right of the plug 234, and the openings 252 and 254 are blocked by the land 218 from a second vent opening 258 formed in the valve body 212 at a position immediately to the left of the end of the plug 248. When the stem 210 is moved to the left by pulling the control wire 226, the land 216 moves between the opening 250 and the vent opening 256 and the land 218 moves between the openings 252 and 254. At this time the openings 250 and 252 are now confluent and the opening 254 is confluent with the vent 258.

The servo motor 198 has a first threaded opening 260 formed in a left end wall 262 of the cylinder 196, which opening is confluent with the bore 201 of the cylinder. A second threaded opening 266 is formed in a right end wall 268 of the cylinder 196 and is confluent with the bore 201. The opening 260 has a first conducting line 270 threaded therein; the other end of the line 270 being threaded into the opening 254 in the valve body 212, while the opening 266 has a second conducting line 272 threaded therein; the other end of the line 272 being threaded into the opening 250 in the valve body 212. A third conducting line 274 is threaded into the opening 252 in the valve body 212 while the other end of the line 274 is suitably connected to a source of fluid pressure in the form of a pump 276.

Accordingly, with the valve stem 210 displaced to the right as shown in FIGS. 2 and 3, the opening 266 in cylinder 196 to the right of piston 200 is vented through the line 272, the opening 250 and the vent opening 256 in the valve 208, while the openings 260 in the cylinder 196 to the left of the piston 200 is pressurized by fluid pressure from the pump 276 through the line 274, the openings 252 and 254 in the valve 208 and the line 270, thus urging the piston 200 to the right as shown in FIG. 2 and carrying the piston rod 194 and the connecting rod 190 to the right and pivoting the crank arm 188, shaft 182 and shift fork 99 counterclockwise, and urging the clutch collar 96 rearwardly into clutching engagement with the gear 92 to adapt the auxiliary transmission 12 for low range operation.

When the valve stem 210 is displaced to the left, by pulling the control wire 226, the opening 260 in the cylinder 196 becomes vented through the line 270, and the opening 254 and the vent 258 in the valve 208, while the cylinder 196 to the right of the piston 200 is pressurized by fluid pressure from the pump 276 through the line 274, the openings 252 and 250 in the valve 208, line 272 and the opening 266 in the cylinder, thus urging the piston 200 to the left and carrying the piston rod 194 and the connecting rod 190 to the left and the crank arm 188, shaft 182 and the shift fork 99 clockwise and urging the clutch collar 96 forwardly into clutching engagement with the gear 84 and adapting the auxiliary transmission 12 for high range or direct drive operation.

Means are provided to interlock the shift rods 108, 138, 144 and 150 and the actuating valve stem 210 whereby the stem may be moved between its alternate positions only when the shift rods are in their neutral positions and so that any one of the shift rods may be moved only when the other shift rods are in their neutral position and the valve stem 210 is in one of its alternate positions.

Particularly, as viewed in FIG. 2 with the rods 108, 138, 144 and 150 in their neutral positions and the stem 210 in its right alternate position, the rod 138 has a detent 278 formed therein on the portion thereof disposed in the boss 112. The rod 144 has a first detent 280 formed therein in an aligned relationship with the detent 278. A poppet 282 is slidingly disposed in an opening 284 formed in the boss 112 and aligned with the detents 278 and 280 and adapted to cooperate therewith. The poppet 282 is of a length so that when positioned in the bottom of either of the detents 278 or 280, it will not be operable to engage the other detent.

Diametrically opposed to the detent 280, a second detent 286 is formed in the rod 144, preferably the same depth as the detent 280. If desired, the detents 280 and 286 may be continuous in the form of an annular groove in the surface of the rod 144. A lockpin 288 is slidably disposed in an opening 290 joining the bottoms of the detents 280 and 286, which pin is of a length equal to the diameter of the rod 144 minus the depth of one of the detents 280 or 286.

The rod 150 is provided with a pair of diametrically opposed detents 292 and 294 of equal depth which are aligned with the detent 286 in the rod 144. A lockpin 296 is slidably disposed in an opening 298 joining the bottoms of the detents 292 and 294, and is of a length equal to the diameter of the rod 150 minus the depth of one of the detents 292 or 294. A poppet 300 is slidably disposed in an opening 302 formed in the boss 112 and aligned with the detents 286 and 292 and adapted to cooperate therewith. The poppet 300 is formed having a length so that when positioned in the bottom of either of the detents 286 or 292 it will not be operable to engage the other detent.

The stem 210 is formed with a first and a second axially spaced annular detent groove 304 and 306 of equal depth with a land area 305 disposed therebetween. It should be noted that the land area 305 and the shoulder 244 on the stem 210 are both smaller in diameter than the bore 214 of the valve 208 so as not to interfere with the vent 258 becoming confluent with the opening 254. When the stem 210 is in its rightward alternate position, as shown in FIGS. 2 and 3, the detent groove 304 is aligned with the detent 294 of the rod 150. When the stem is disposed in its alternate leftward position, the detent groove 306 is aligned with the detent 294. A poppet 308 is slidably disposed in an opening 310 formed in the boss 112 and aligned with the detent 294, and is of a length so that when positioned in the bottom of either of the detents 304, 306 it will not be engageable with the detent 294, and when positioned in the bottom of detent 294 it will not be engageable with the detents 304 and 306. As previously discussed regarding the detents 280 and 286 in the rod 144 and the detents 304 and 306 in the stem 210, the detent 278 in rod 138 and the detents 292 and 294 in the rod 150 may likewise be formed as annular grooves in the periphery of the rods containing the same.

*Operation of the interlocking means*

When any one of the rods 138, 144 or 150 (the rod 108 moves simultaneously with the rod 150 so that no separate interlocking device is needed therefor) is moved from the neutral position shown in FIG. 2, each of the other rods will be locked in its neutral position and the valve stem 210 will be locked in the alternate position it is in at that time. More particularly, if the rod 138 is moved from its neutral position to either its second or third speed position, the poppet 282 will be cammed out of the detent 278 in rod 138 and forced to the bottom of the detent 280 in the rod 144 thereby locking the rod 144 in its neutral position. The poppet 282 further forces the lockpin 288 against the poppet 300 urging the latter into the detent 292 in the rod 150 thereby locking the rod 150 and rod 108 simultaneously movable therewith in their neutral positions. The poppet 300 also forces the lockpin 296 against the poppet 308 urging the latter into the detent 304 or 306 in the stem 210 (whether the detent 304 or 306 is engaged being determined by the position of the stem in one of its alternate positions). Accordingly, each rod, except rod 138, is locked in its neutral position and the stem 210 is locked in one of its alternate positions and can not at this time be moved. Upon return of the rod 138 to its neutral position, the interlocking means are once again unlocked so that one of the rods or stem 210 can be moved.

Upon return of the rod 138 to its neutral position so that all the rods are again neutralized, if the rod 144 is moved to either its fourth or fifth speed position, the poppets 282 and 300 respectively will be cammed out of the detents 280 and 286 in the rod 144 into the detent 278 in the rod 138 and detent 292 in the rod 150 respectively. The poppet 282 will lock the rod 138 in its neutral position while the poppet 300 will lock the rod 150 in its neutral position. Further, the poppet 300 forces the lockpin 296 against the poppet 308 urging the latter into the aligned detent grooves 304 or 306 in the stem 210 locking the same in its alternate position. Thus, each of the rods, except the rod 144 is locked in its neutral position, and the stem 210 is locked in one of its alternate positions.

Starting with all the rods in their neutral position, when the reverse actuating rod 150 is moved rearwardly from its neutral position by the finger's 122 urging engagement with the block 168, or moved forwardly in response to rearward movement of the rod 108, the poppets 300 and 308 respectively will be cammed out of the detents 292 and 294 in the rod 150 and into the detent 286 in the rod 144 and the detent 304 or 306 in the stem 210 respectively. The poppet 308 will lock the stem 210 in one of its alternate positions while the poppet 300 will lock the rod 144 in its neutral position. The poppet 300 also urges the lock pin 288 against the poppet 282 thereby forcing the latter into neutral locking engagement with the detent 278 in the rod 138. At this time, each of the rods, except the rod 150, is locked in its neutral position, and the stem 210 is locked in one of its alternate positions.

Accordingly, it is apparent that with any one of the rods 138, 144 and 150 displaced from its neutral position, the poppet 308 will be in engagement with one of the detents 304 or 306 in the actuating stem 210 so that the operator cannot move the actuating stem (by moving the control wire 226), to actuate the servo motor 198 and shift the auxiliary transmission 12, while when the rods are all in their neutral positions, the operator may move the shift actuating stem 210 between its alternate positions to actuate the servo motor. It should also be noted that if the actuating stem 210 is not in one of its alternate positions, the land 305 between the detents 304 and 306, holds the poppet 308 in neutral maintaining engagement with the detent 294 in the rod 150, which poppet 308 in turn holds the lockpin 296 against the poppet 300 positioning the latter in neutral maintaining engagement with the detent 286 in the rod 144, and the poppet 300 in turn holds the lockpin 288 against the poppet 282 positioning the latter in neutral maintaining engagement with the detent 278 in the rod 138, so that none of the rods can be moved from their neutral position until the movement of the stem 210 from one to its other alternate position is completed.

While only one embodiment of this invention has been shown and described, it is understood that such is illustrative only and not for the purpose of limiting this invention as defined by the following claims.

What is claimed is:

1. An automotive transmission comprising in combination,
    (a) a first multi-speed transmission having change speed gearing,
    (b) a second multi-speed transmission having change speed gearing serially connected to said first transmission,
    (c) a plurality of shift rod means in said first transmission operatively connected to said change speed gearing for shifting the same,
    (d) a pressure operated servo motor operatively connected to said change speed gearing of said second transmission, for shifting the same,
    (e) an actuating valve for directing the flow of pressure to said servo motor and including a selectively positionable valve stem and means for moving said stem between its positions,
    (f) and means interlocking said shift rod means and said valve stem and locking the latter in its selected position when any one of said shift rod means are displaced from its neutral position.

2. A control system for an automotive transmisison comprising in combination,
    (a) an input means,
    (b) a final output means,
    (c) an input power path means,
    (d) first coupling means drivingly connecting said input power path means to said input means and for disconnecting said input power path means from said input means,
    (e) an output power path means,
    (f) second coupling means for drivingly connecting said output power path means in a driving relationship between said input power path means and said final output means,

11

(g) said first coupling means having alternate positions including a first input power path means connecting position and a disconnecting position,
(h) first shifting means operatively connected to said first coupling means for shifting the same to its alternate positions,
(i) said second coupling means having alternate positions, one being a first output power path means position,
(j) servo motor shift means operatively connected to said second coupling means for shifting the same to its alternate positions,
(k) actuating means for said servo motor having a first and a second selectable position and being operative in said first position to actuate said servo motor to shift said second coupling means to one of its alternate positions and being operative in said second position to actuate said servo motor to shift said second coupling means to the other of its alternate positions,
(l) and interlocking means operative to be moved into locking engagement with said actuating means when the latter is in a selected position and preventing movement thereof,
(m) said first shift means being operative in its connecting position to move said interlocking means into locking engagement with said actuating means whereby the latter is locked in its selected position,
(n) said interlocking means being free from locking engagement with said actuating means when said first shift means is in its neutral position whereby said actuating means may be moved to a selective position.

3. A control system for an automotive transmission comprising in combination,
(a) an input means,
(b) a final output means,
(c) a pair of input power path means,
(d) first coupling means selectively drivingly connecting one of said input power path means to said input means and for disconnecting said pair of input power path means from said input means,
(e) a pair of output power path means,
(f) second coupling means for selectively drivingly connecting one of said output power path means in a driving relationship between said one input power path means and said final output means,
(g) said first coupling means having alternate connecting positions including a first input power path means connecting position and a second input power path means connecting position and a disconnecting position,
(h) first shifting means operatively connected to said first coupling means for shifting the same to its alternate positions and to its disconnected position,
(i) said second coupling means having alternate positions including a first output power path means position and a second output power path means position,
(j) servo motor shift means operatively connected to said second coupling means for shifting the same to its alternate position,
(k) actuating means for said servo motor having a first and a second selectable position and being operative in said first position to actuate said servo motor to shift said second coupling means to one of its alternate positions and being operative in said second position to actuate said servo motor to shift said second coupling means to the other of its alternate positions,
(l) and interlocking means operative to be moved into locking engagement with said actuating means when the latter is in a selected position and preventing movement thereof,
(m) said first shift means being operative in its alternate connecting positions to move said interlocking means into locking engagement with said actuating means whereby said actuating means is locked in its selected position,
(n) said interlocking means being free from locking engagement with said actuating means when said first shift means is in its neutral position whereby said actuating means may be moved to a selective position.

4. A control system for an automotive transmission comprising in combination,
(a) an input shaft means,
(b) a final output shaft means,
(c) a first and a second gear group operatively connecting said shaft means,
(d) said first gear group including at least a pair of alternate driving gears and a clutch means having a first alternate position drivingly connecting one of said driving gears to said input shaft and a second alternate position drivingly connecting the other of said driving gears to said input shaft and a neutral position wherein neither of said driving gears are drivingly connected to said input shaft,
(e) first shift means operatively connected to said clutch means and having a first and second alternate position and a neutral position for shifting said clutch means to its respective alternate positions and its neutral position,
(f) said second gear group including at least a second driving gear for drivingly connecting said first gear group and said final output shaft and a second clutch means having a first alternate position connecting said second driving gear in a driving relationship between said first gear group and said final output shaft and a second alternate position drivingly connecting said first gear group and said final output shaft,
(g) servo motor means operatively connected to said second clutch for shifting the same to its alternate first and second positions,
(h) actuating means for actuating said servo motor and having a selectable first and second alternate position wherein said servo motor shifts said second clutch means to its respective alternate first and second positions,
(i) and means for interlocking said first shift means and said actuating means,
(j) said interlocking means locking said actuating means in its selected alternate position upon said first shifting means moving from its neutral position and unlocking said actuating means upon said first shifting means entering its neutral position.

5. A control system for an automotive transmission comprising in combination,
(a) an input shaft means,
(b) a final output shaft means,
(c) a first and a second gear group operatively connecting said shaft means,
(d) said first gear group including at least a first pair of alternate driving gears and a clutch means,
(e) said clutch means having a neutral position wherein the same is free from driving engagement with said first pair of gears and a first alternate position clutchingly engaging one of said first pair of driving gears in a driving relationship with said input shaft and a second alternate position clutchingly engaging the other of said first pair of driving gears in a driving relationship with said input shaft,
(f) first shift means having a first and a second alternate positions and a neutral position operatively connected to said clutch means for shifting the latter to its respective alternate position and to its neutral position,
(g) said second gear group including at least a second driving gear and a second clutch means,
(h) said second clutch means having a first alternate position clutchingly engaging said second driving gear in a driving relationship between said first gear group and said final output shaft means and a second alternate position clutchingly engaging said first gear group to said final output shaft means, (i) servo motor means operatively connected to said second clutch means and being operative to shift the same alternately to its first and second position, (j) actuating means for actuating said servo motor and having a selectable first and second alternate position wherein said servo motor shifts said second clutch means to its respective alternate first and second positions, (k) said actuating means and said first shifting means being disposed in cooperating relationship, (l) and means for interlocking said first shift means and said actuating means and locking said actuating means in its selected alternate position upon said first shifting means moving from its neutral position and unlocking said actuating means upon said first shifting means entering its neutral position.

6. A control system for an automotive transmission comprising in combination, (a) an input means,
(b) a final output means,
(c) a pair of input power path means,
(d) a first coupling means having a neutral position wherein the same is free from driving engagement with said input power path means and a first alternate position coupling one of said input power path means in a driving relationship with said input means and a second alternate position coupling the other of said input power path means in a driving relationship with said input means,
(e) shift rod means operatively connected to said coupling means and having a first and a second alternate positions and a neutral position for shifting said coupling means to its respective alternate positions and its neutral position,
(f) a pair of output power path means operative to drivingly connect said input means to said output means,
(g) a second coupling means having a first alternate position coupling one of said pair of output power path means in a driving relationship between said input power path means and said output power path means and a second alternate position coupling other of said pair of output power path means in a driving relationship between said input power path means and said output means,
(h) fluid pressure differential servo motor means including means operatively connecting the same with said second coupling means,
(i) said servo motor means being operative to move said means operatively connected thereto to first and second alternate positions for shifting said second coupling means to its respective first and second alternate positions,
(j) a source of fluid pressure for said servo motor,
(k) actuating valve means for directing the flow of fluid pressure to said servo motor,
(l) said valve means including a movable actuating stem means disposed in cooperative relatively movable relationship with said shift rod means,
(m) said actuating stem means having a selectable first and second alternate positions wherein the flow of said fluid pressure to said servo motor energizes the latter to move said second coupling means to its respective first and second alternate positions,
(p) cooperating detent means disposed on said stem means and on said shift rod means,
(o) said detent means being disposed in aligned relationship when said shift rod means is in its neutral position and said stem means is in either of its alternate positions and moving to an unaligned relationship when said shift rod means moves from its neutral position,
(p) and interlock means cooperable with said detent means and being free from locking engagement therewith when said detent means are aligned whereby said stem means and shift rod means are movable relative to each other and being urged into locking engagement with said detent means on said stem means by said shift rod means when the latter moves from its neutral position thereby locking said stem means in its alternate position.

7. A control system for an automative transmission having a case comprising in combination, (a) an input shaft means,
(b) a final output shaft means,
(c) a first and a second gear group operatively connecting said shaft means,
(d) said first gear group including at least a first pair of alternate driving gears and a clutch means,
(e) said clutch means having a neutral position wherein the same is free from driving engagement with said first pair of driving gears and a first alternate position clutchingly engaging one of said first pair of driving gears in a driving relationship with said input shaft means and a second alternate position clutchingly engaging the other of said first pair of driving gears in a driving relationship with said input shaft means,
(f) shift rod means including means operatively connecting the same to said clutch means,
(g) said shift rod means having a first and a second alternate positions and a neutral position for shifting said clutch means to its respective alternate positions and its neutral position,
(h) said second gear group including at least a second alternate driving gear and a second clutch means,
(i) said second clutch means having a first alternate position drivingly engaging said second driving gear in a driving relationship between said first gear group and said final output shaft means and a second alternate position drivingly engaging said first gear group and said final output shaft,
(j) fluid pressure differential servo motor means including means operatively connecting the same to said second clutch means,
(k) said servo motor means being operative to move said means operatively connected thereto to first and second alternate positions for shifting said second clutch means to its respective first and second alternate positions,
(l) a source of fluid pressure for said servo motor,
(m) actuating valve means for directing the flow of fluid pressure to said servo motor,
(n) said valve means including a movable actuating stem means disposed in cooperating relatively movable relationship with said shift rod means,
(o) said actuating stem means having a selectable first and second alternate position wherein the flow of said fluid pressure to said servo motor energizes the latter to move said second clutch means to its respective first and second alternate positions,
(p) and interlocking means for lockingly engaging and maintaining said actuating stem means in its selected alternate position,
(q) and means associated with said shift rod means and operative to move said interlocking means into locking engagement with said actuating stem means upon movement of said shift rod means from its neutral position thereby locking said actuating stem means in its alternate position and operative upon movement of said shift rod means to its neutral position to unlock said interlocking means from said actuating stem means whereby the latter is movable between its alternate positions.

8. A control system for an automotive transmission having a case comprising in combination,
 (a) an input shaft means,
 (b) a final output shaft means,
 (c) a first and a second gear group operatively connecting said shaft means,
 (d) said first gear group including at least a first pair of alternate driving gears and a clutch means,
 (e) said clutch means having a neutral position wherein the same is free from driving engagement with said first pair of driving gears and a first alternate position clutchingly engaging one of said first pair of driving gears in a driving relationship with said input shaft means and a second alternate position clutchingly engaging the other of said first pair of driving gears in a driving relationship with said input shaft means,
 (f) shift rod means including means operatively connecting the same to said clutch means,
 (g) said shift rod means having a first and a second alternate positions and a neutral position for shifting said clutch means to its respective alternate positions and its neutral position,
 (h) said second gear group including at least a second driving gear and a second clutch means,
 (i) said second clutch means having a first alternate position drivingly engaging said second driving gear in a driving relationship between said first gear group and said final output shaft means and a second alternate position drivingly engaging said first gear group to said final output shaft,
 (j) fluid pressure differential servo motor means including means operatively connecting the same to said second clutch means,
 (k) said servo motor means being operative to move said means operatively connected thereto to first and second alternate positions for shifting said second clutch means to its respective first and second alternate positions,
 (l) a source of fluid pressure for said servo motor,
 (m) actuating valve means for directing the flow of fluid pressure to said servo motor,
 (n) said valve means including a movable actuating stem means disposed in cooperative relatively movable relationship with said shift rod means,
 (o) said actuating stem means having a selectable first and second alternate positions wherein the flow of said fluid pressure to said servo motor energizes the latter to move said second clutch means to its respective first and second alternate positions,
 (p) cooperating detent means disposed on said stem means and on said shift rod means,
 (q) said detent means being disposed in aligned relationship when said shift rod means is in its neutral position and said stem means is in either of its alternate positions and moving to an unaligned relationship when said shift rod means moves from its neutral position,
 (r) and interlock means cooperable with said detent means and being free from locking engagement therewith when said detent means are aligned whereby said stem means and said shift rod means are movable and being urged into locking engagement with said detent means on said stem means by said shift rod means when the latter moves from its neutral position thereby locking said stem means in its alternate position.

9. A control system for an automotive transmission comprising in combination,
 (a) an input shaft means and an intermediate output shaft means,
 (b) a first gear group operative to drivingly connect said shaft means and including at least a pair of change speed gears and a clutch means,
 (c) said clutch means having a neutral position wherein the same is free from driving engagement with said first pair of gears and a first alternate position clutchingly engaging one of said first pair of gears in a driving relationship with said shaft means and a second alternate position clutchingly engaging the other of said first pair of gears in a driving relationship with said shaft means,
 (d) shift rod means including means operatively connecting the same to said clutch means,
 (e) said shift rod means having a first and a second alternate positions and a neutral position for shifting said clutch means to its respective alternate positions and its neutral position,
 (f) a final output shaft means,
 (g) a second gear group operative to drivingly connect both said output shaft means and including at least a second change speed gear and a second clutch means,
 (h) said second clutch means having a first alternate position drivingly engaging said second change speed gear in a driving relationship between said output shafts and a second alternate position drivingly engaging said output shafts,
 (i) fluid pressure differential servo motor means including means operatively connecting the same to said second clutch means,
 (j) said servo motor means being operative to move said means operatively connected thereto to first and second alternate positions for shifting said second clutch means to its respective first and second alternate positions,
 (k) a source of fluid pressure for said servo motor,
 (l) actuating valve means for directing the flow of fluid pressure to said servo motor,
 (m) said valve means including a movable actuating stem means disposed in substantially parallel aligned relatively movable relationship with said shift rod means,
 (n) said actuating stem means having a selectable first and second alternate positions wherein the flow of said fluid pressure to said servo motor energizes the latter to move said second clutch means to its respective first and second alternate positions,
 (o) an interlocking means for lockingly engaging and maintaining said actuating stem means in its selected alternate position,
 (p) said interlocking means including cooperating detent means disposed in said shift rod means and in said actuating stem and poppet means having opposed ends with each end adapted to engage one of said detent means,
 (q) said detent means being aligned when said shift rod is in its neutral position and said actuating stem is in one of its alternate positions and said poppet means being of a length so that when one end thereof is disposed in the bottom of one of said detents the other end is free from engagement with the other of said detents while substantially engaging the portion of said shift rod adjacent the detent therein,
 (r) said detent of said shift rod means being operative to said poppet means into said detent means of said actuating stem means upon movement of said shift rod means from its neutral position and the remaining portion of said shift rod means maintaining said poppet means in said last named detent whereby said actuating stem means is locked in its alternate position.

10. An automotive transmission comprising in combination,
 (a) a main transmission having a first input shaft a first countershaft and a first output shaft,
 (b) gear means operative to drivingly connect said shafts and including (1) at least a first pair of change speed gears rotatably mounted on one of said first shafts and
(2) a second pair of gears carried by another of said shafts and meshingly engaging said first pair of gears,
(c) clutch means driving carried by said one shaft and having a neutral position spaced from said first pair of gears a first alternate position drivingly connecting one of said first pair of gears to said one shaft and a second alternate position drivingly connecting the other of said first pair of gears to said one shaft,
(d) shift fork means engaging said clutch means and operative to move the same to said neutral and alternate positions,
(e) shift rod means operatively connected to said shift fork means and movable to a neutral position and first and second alternate positions to move said clutch means to its respective neutral and alternate positions,
(f) an auxiliary transmission including at least a second countershaft and a second output shaft,
(g) said second countershaft being operatively connected to said first output shaft so that the first output shaft functions as a second input shaft for said auxiliary transmission,
(h) a second change speed gear rotatably mounted on one of said second shafts,
(i) a gear carried by another of said second shafts and meshingly engaging said second change speed gear,
(j) a second clutch means drivingly carried on said one of said second shafts and having a first alternate position drivingly connecting said second change speed gear to said one of said second shafts and a second alternate position drivingly connecting said second input shaft and said second output shaft,
(k) connecting means operatively connected to said second clutch means and having a first and second alternate positions for moving said second clutch means to its respective alternate positions,
(l) fluid pressure operated servo motor means having first and second alternate positions for moving said connecting means to its respective alternate position,
(m) an actuating valve for directing the flow of fluid pressure to said servo motor means and including a valve stem having a first and a second alternate positions for energizing corresponding movement of said servo motor means to its first and second alternate positions,
(n) a first detent means on said shift rod means,
(o) and a second and third detent means on said valve stem,
(p) said valve stem and said shift rod means being disposed in cooperating relationship and so constructed and arranged that with said shift rod in its neutral position and said valve stem in its first alternate position that first and second detent means are aligned and when said shift rod is in its neutral position and said valve stem is in its second position said first and third detent means are aligned,
(q) and poppet means adapted to engage said detents and being positioned so that it is aligned with said aligned detents and being of a length so that when seated in said second and third detent respectively it is free from engagement with said first detent and when said first detent is moved to an unaligned relationship with said poppet means said shift rod means engages said poppet means and maintains the same in the detent means on said valve stem aligned therewith, whereby said valve stem is locked in one of its alternate positions by said poppet means when said shift rod means is moved from its neutral position.

References Cited by the Examiner
UNITED STATES PATENTS
2,637,221  5/1953  Backus et al. _____ 74—745

DON A. WAITE, *Primary Examiner.*